(12) United States Patent
Gilbert et al.

(10) Patent No.: US 7,233,791 B2
(45) Date of Patent: *Jun. 19, 2007

(54) CELL PHONE FEATURE FOR DOWNLOADING INFORMATION VIA A TELECOMMUNICATIONS NETWORK

(75) Inventors: Alicia Marie Gilbert, San Diego, CA (US); Keith Cocita, Santa Cruz, CA (US)

(73) Assignee: X-Cyte, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/185,621

(22) Filed: Jul. 19, 2005

(65) Prior Publication Data

US 2005/0250522 A1 Nov. 10, 2005

Related U.S. Application Data

(63) Continuation-in-part of application No. 10/405,348, filed on Apr. 1, 2003, now Pat. No. 7,054,624.

(60) Provisional application No. 60/369,431, filed on Apr. 2, 2002.

(51) Int. Cl.
*H04M 3/00* (2006.01)

(52) U.S. Cl. ........................ 455/419; 455/418; 455/466

(58) Field of Classification Search ................ 455/419, 455/418, 466, 414.1, 414.3, 415
See application file for complete search history.

(56) References Cited

U.S. PATENT DOCUMENTS 5,898,783 A 4/1999 Rohrbach

| 6,625,444 B1* | 9/2003 | Fleming et al. ............. 455/418 |
| 2003/0162497 A1 | 8/2003 | Curtiss et al. |
| 2004/0023644 A1* | 2/2004 | Montemer ................ 455/414.1 |
| 2004/0132500 A1 | 7/2004 | Janssen et al. |
| 2004/0198329 A1* | 10/2004 | Vasa ........................ 455/414.1 |
| 2006/0052091 A1* | 3/2006 | Onyon et al. ................ 455/415 |

OTHER PUBLICATIONS palmOne Wireless Solutions, http://www.palmone.com/us/wireless/email/business-company/treo600/goodlink.html, printed Mar. 9, 2005.
International Search Report, PCT/US04/09224, filed on Oct. 13, 2004.

* cited by examiner

*Primary Examiner*—Lewis West

(57) ABSTRACT

The present invention permits safeguarding of private data entered into a memory chip of a cell phone by permitting the cell phone owner to erase the data in a lost or stolen phone, using an preset erase code and erase command in the cell phone or the network base station, and disabling or erasing circuitry on the memory chip, preferably an EEPROM chip. Further, a user of the cell phone may obtain information of a person or entity, via a cellular communications network, by dialing a directory assistance number and requesting information associated with the name of the person or entity the user has requested information of. The information may be provided to the user in the form of a vcard and may include, among other information, telephone and facsimile numbers, mailing addresses, instant messaging addresses, maps or directions, digital photos or videos, and the like.

9 Claims, 5 Drawing Sheets

CELL PHONE FEATURE FOR DOWNLOADING INFORMATION VIA A TELECOMMUNICATIONS NETWORK

CROSS-REFERENCE TO RELATED APPLICATIONS

This application is a continuation-in-part of U.S. patent application Ser. No. 10/405,348, filed Apr. 1, 2003 now U.S. Pat. No. 7,054,624, which claims the benefit of U.S. Provisional Patent Application No. 60/369,431, filed Apr. 2, 2002.

FIELD OF THE INVENTION

The present invention is directed to cell phones with memory, and to a method and apparatus for safeguarding the private, owner information entered into the cell phone memory, and to the use of a telecommunications network to remotely erase cell phone memory. The present invention is also directed at obtaining information (e.g. e-mail address, instant messaging address, mailing address, etc.) associated with the name of a person or entity, by dialing a directory assistance number on a cellular communications network.

BACKGROUND OF THE INVENTION

Modern telecommunications networks include mobile stations, such as cell phones, which utilize a SMARTCARD which includes a SIM (subscriber identity module). The SIM's have a memory chip that contains data such as the identity of the card holder (i.e., the service subscriber), billing information, and home location. When a cell phone user places a call, the SIM communicates the unique SIM code to the network. The network checks to see if the SIM code owner is a current subscriber to the network service, often by matching the SIM code with a list of authorized SIM codes. This authentication, or matching of SIM codes generally precedes all other network communication with the cell phone.

SMARTCARDS were developed to allow cell phone activities other than simple telephone calls. The SMARTCARD can contain microprocessors for, e.g., transaction management data encryption and user authentication. The SMARTCARD or the SIM may include subscriber entered telephone numbers and other valuable information. Theft of the phone places this valuable information in the hands of others. In fact, the loss of the phone is probably less important than the loss of the valuable information contained therein. This is especially true for the new cell phones which now access the Internet, and for cell phones coupled with handheld computing devices which browse the Internet, store Power Point presentations, and do rudimentary word processing, as well as scheduling appointments and maintaining expense accounts.

Many security features have been developed for cell phones. Most of these are related to prevention of theft of communication services by permanently disabling a stolen phone, temporarily disabling a phone for which the subscriber is in arrears, or blocking calls to geographical regions which are not part of the subscriber's contract.

U.S. Pat. No. 5,898,783 discloses a telecommunications network with disabling circuitry which can disable the SMARTCARD of the cell phone of a particular subscriber. The disable command can permanently incapacitate the SMARTCARD by destroying the power connection for the logic circuitry, or temporarily incapacitate the logic circuitry by erasing the memory within the card. According to this patent, the numbers of stolen phones can be reported to the network and entered into a database which is searched when any cell phone requests service, and a disable command or signal returned to the cell phone if its number is in the disable database. In the present invention, the subscriber erases the memory containing the private information without the additional steps and involvement of the network, giving the subscriber greater freedom and opportunity to safeguard their private information.

U.S. Pat. No. 5,734,978 describes a telecommunications system having a manufacturer preset destruct code stored in each cell phone. When a subscriber reports a phone stolen, the network's base station controller initiates a destruct program, using the destruct code. The destruct code destroys the data necessary for performing the telephone functions, but not the private data.

U.S. Pat. No. 6,259,908 describes a cellular phone system in which a locking code on a particular cell phone may be erased by means of a message transmitted through the cell phone system, but may not be erased or changed using the keyboard features of that phone. This arrangement has particular usefulness in a designated cellular system with many units, such as a communications network for the fire department of a large city. To set up or reconfigure the network, the entire network must be activated and the individual units (cell phones) assigned a particular number. According to the patent, all phones on the system have a locking code to prevent theft communications on the network until all units are assigned. This is a subscriber system approach to preventing theft of service of the communications system, and does not relate to the privacy of data of individual subscribers.

SUMMARY OF THE INVENTION

It is an object of the present invention to safeguard the private data entered into a cell phone by its owner, by permitting the owner to erase or destroy that data using an on-air signal. According to the present invention the memory chip of a cellular phone on which private data is recorded may be provided with an erase means. This erase means could comprise a fuse, switch, or similar device in a disable, or erase, circuit. The erase means executes an erase command on receiving an on-air erase code which matches the erase code preset by the owner. If the mobile phone is lost or stolen, the owner need only call the telephone number of the lost or stolen phone and enter the erase code. The private data will be erased. Thus, the owner can protect the phone numbers and the addresses of family, friends and associates If the owner believes the phone has been misplaced, he can destroy the private information without disabling the telephone features, should the missing phone be found.

It is also an object of the present invention to maintain the privacy and integrity of the cell phone owner's data, as well as to facilitate its transfer to a new cell phone. The integrity of the private data can be maintained with a novel recharging cradle or station. According to the present invention, the cell phone recharging cradle or station may incorporate a slot for a memory device, such as a PCMCIA card, which communicates with a phone docked in the cradle. Every time the phone is placed in the cradle for recharging the PCMCIA card does a check sum of the phone's memory. If numbers or other data have been entered into the phone, the card downloads that information so that the card is always updated. When a new phone is charged in the base station, the check sum is started, and all private data entered into the previous phone is automatically uploaded into your new phone. Using this system, if the user does not want anyone else to have access to their numbers they may simply remove the PCMCIA card from the phone. Also, a backup card can be easily carried in a wallet, when traveling.

It is also an object of the present invention to provide a method of obtaining information associated with the name of a person or entity via a cellular network. According to this aspect of the invention, a user of a mobile telecommunications apparatus dials a directory assistance telephone number and requests information associated with a name of a person or entity from a wireless network operating center. Upon receiving the request for information, an operator at the wireless network operating center uses the name of the person or entity to retrieve information associated with the person or entity from an information database. As explained in more detail, the information retrieved from the information database may include one or more of the following: telephone and/or facsimile numbers, mailing addresses, instant messaging addresses, maps and/or directions, digital photos, digital video, etc. After retrieving the information from the information database, the wireless network operating center transmits a data message (e.g. a text message) containing the retrieved information to the mobile communications device. The information received by the mobile telecommunications apparatus is then allowed to permanently store the information, e.g., in the form of a virtual business card ("vcard").

These objects, as well as other objects which will become apparent from the discussion that follows are achieved, in accordance with the present invention which comprises a cell phone programmable memory chip with erase means; a recharging cradle with slot for, e.g., a PCMCIA card, which can upload data from, or download data into, a cell phone docked therein; and a cell phone apparatus with a) first memory for storing the unique identification numbers of the apparatus b) transmitting/reception means for transmitting and receiving a call in accordance with said identification numbers, c) an EEPROM with a programmable data base for data, and a predetermined address (or memory location) for an erase code, d) means for entering erase code at the predetermined location, and e) erasing means for erasing said database on receipt of the erase code.

These objects are also achieved by the method of the present invention, for safeguarding private data stored in a selected cell phone on a mobile telecommunications system which comprises a plurality of individual mobile cell phone apparatus and a mobile telephone switching office, said at least one selected apparatus having a PROM for storing private data including an erase code, and a unique telephone number, said method comprising receiving at the selected mobile phone apparatus from the switching network, a message containing the erase code from the switching network, and erasing the private data.

For a full understanding of the present invention, reference should flow be made to the following detailed description of the preferred embodiments of the invention as illustrated in the accompanying drawings.

BRIEF DESCRIPTION OF THE DRAWINGS

FIG. 5 is a block diagram illustrating obtaining information of a person or entity, via a cellular communications network, by dialing a directory assistance number and requesting information associated with the name of the person or entity the user has requested information of.

DESCRIPTION OF THE PREFERRED EMBODIMENTS

Figure 1:
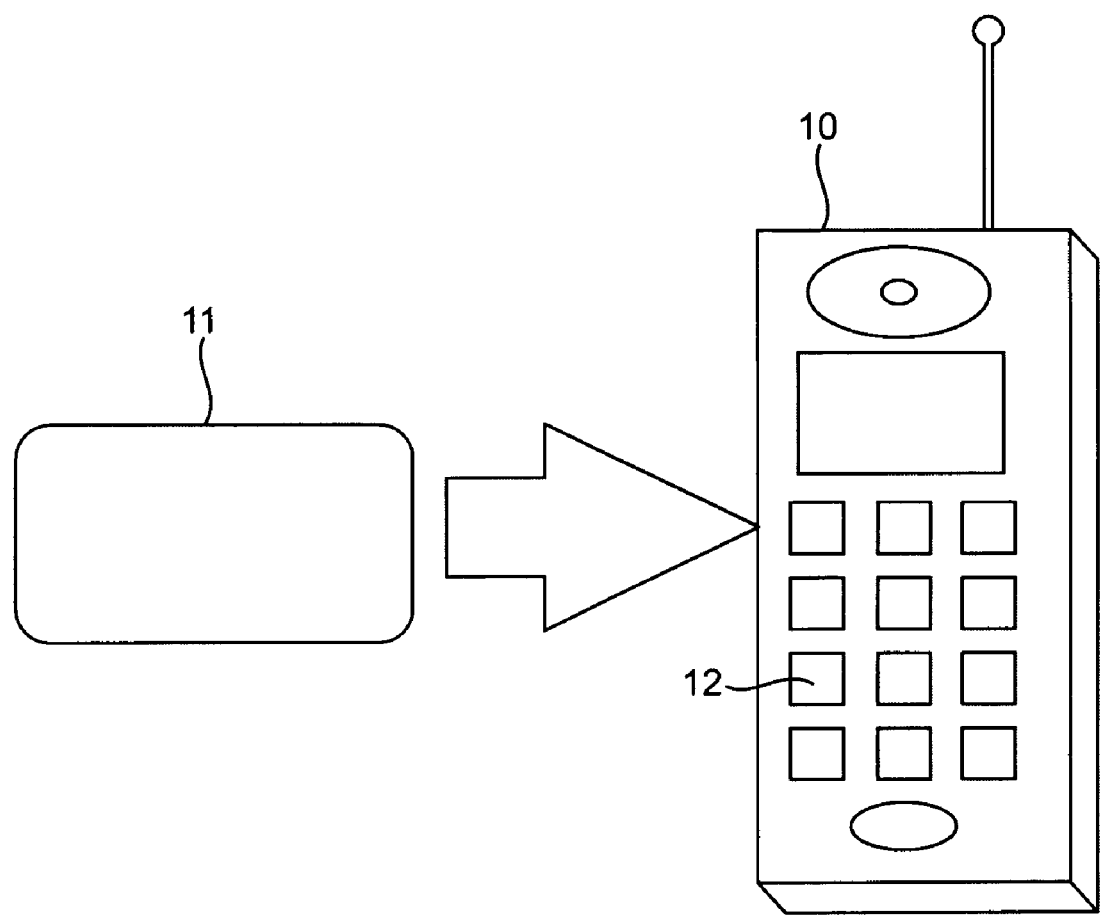
FIG. 1 illustrates a cell phone, or mobile telecommunications apparatus, and the SMARTCARD that is received therein, which cooperates with the cell phone to effect communication with a telecommunications network.

The preferred embodiments of the present invention will now be described with reference to FIGS. 1-4 of the drawings. Identical elements in the various figures are designated with the same reference numerals.

Figure 3:
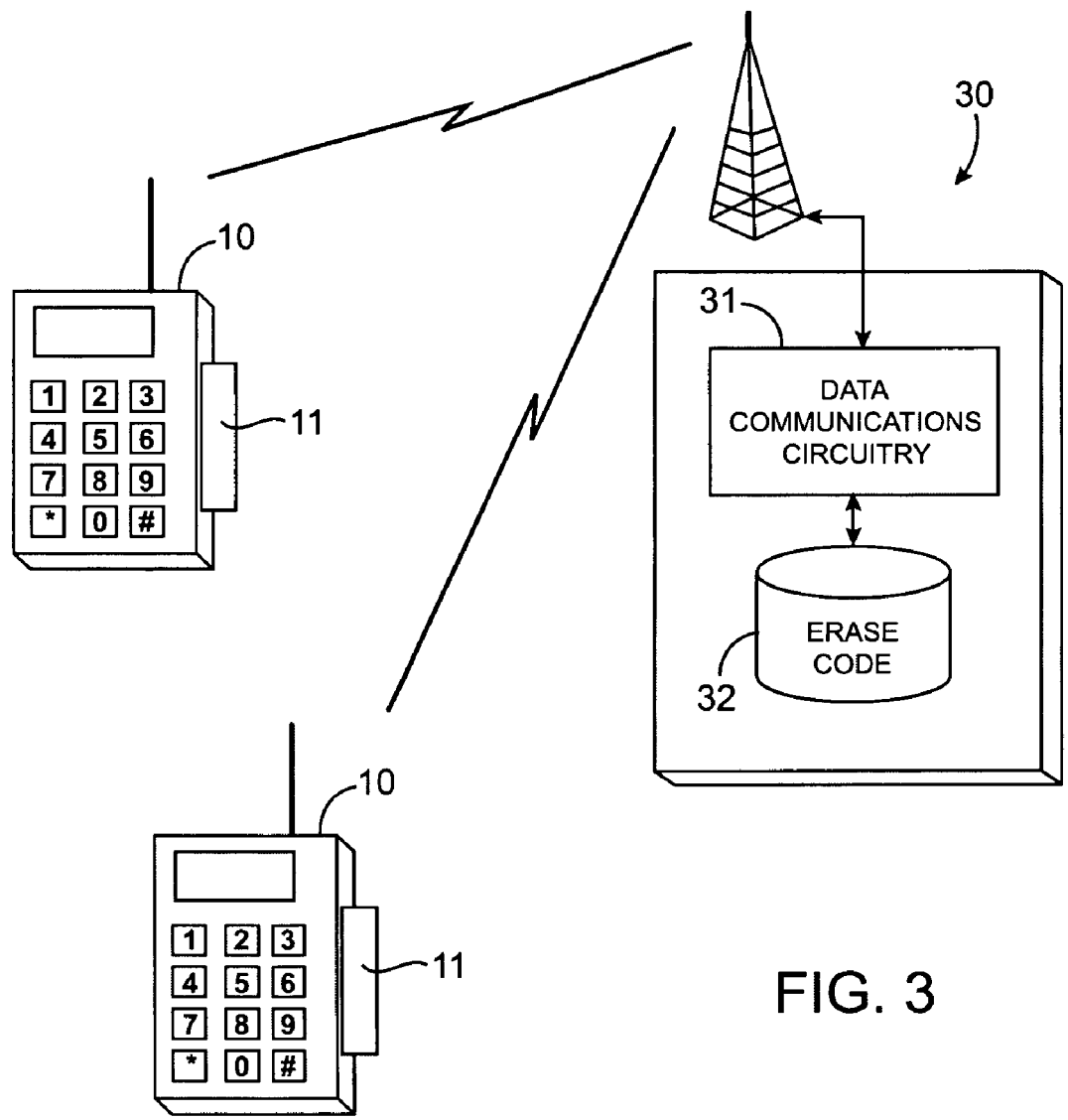
FIG. 3 illustrates a block diagram of a telecommunications network capable of communicating with a plurality of cell phones that cooperate with a SMARTCARD to effect communication with the telecommunications network.

As shown in FIG. 1, the cell phone 10 receives the SMARTCARD 11 which cooperates with the cell phone to effect communication with a telecommunications network, such as that illustrated in FIG. 3. The SMARTCARD, includes a SIM (subscriber identity module). The SMART-CARD identifies the user of the telecommunications system, and serves to authenticate the user as one permitted on the network. The SMARTCARD may also encrypt communications between the cell phone 10 and the telecommunications network. The alphanumeric keys, 12 of the cell phone may be used to enter information into the cell phone memory, and are the preferred means for entering the erase code.

Figure 2:
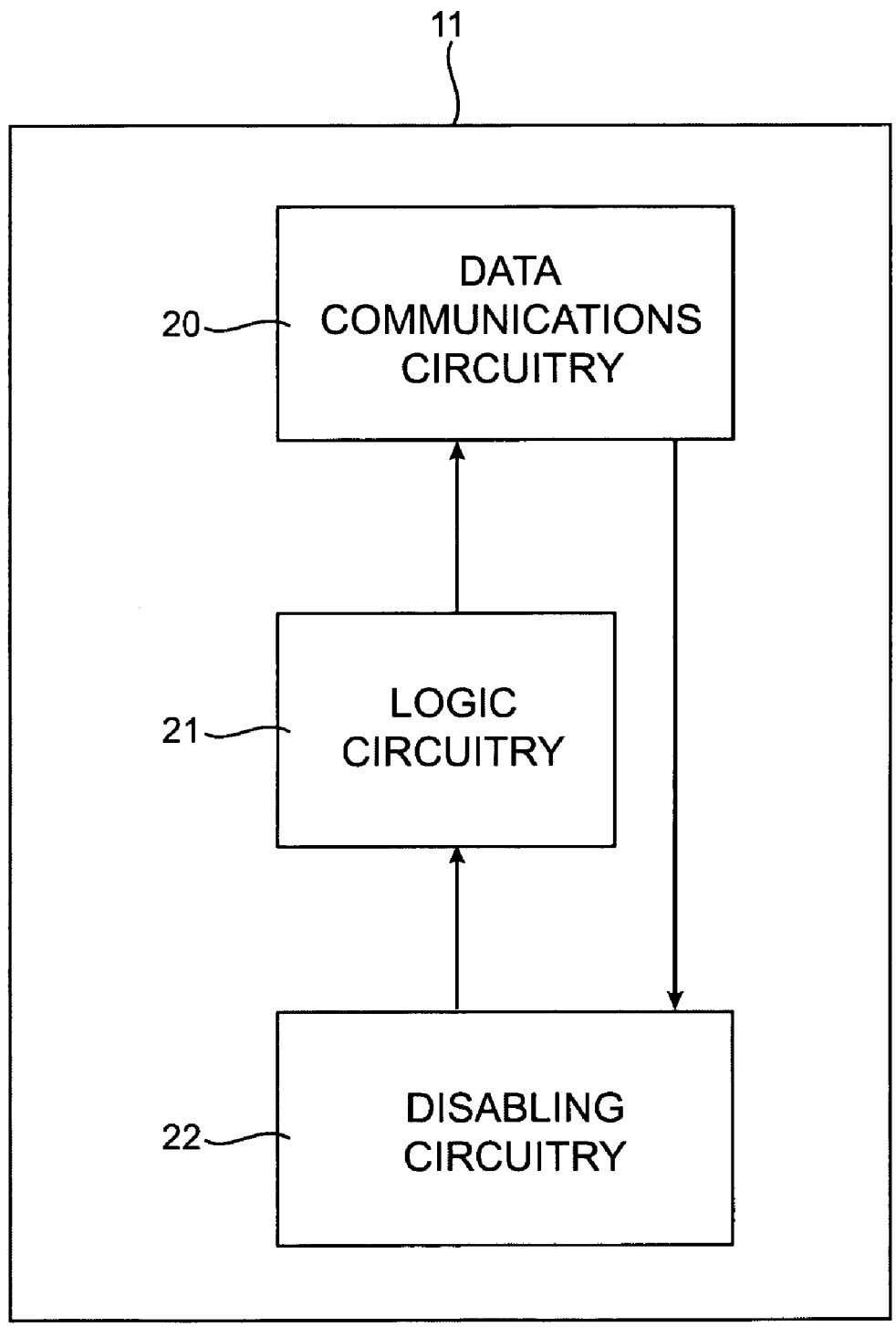
FIG. 2 illustrates a block diagram of a SMARTCARD according to the principles of the present invention.

The elements of the SMARTCARD illustrated in FIG. 2, include a data communications circuitry, a logic circuitry and a disabling, or erasing, circuitry. The data communications circuitry 20, transmits a code uniquely identifying the SMARTCARD. The logic circuitry, 21, in the present embodiment includes data processing and storage circuitry and interconnecting circuitry including, without limitation, a processor, memory, support circuitry, and any address, data and control buses (not shown). In one embodiment of the present invention the logic circuitry encrypts communication between the cell phone and the telecommunications network. As cell phones develop, the logic circuitry may be used to perform more and more functions, without effecting the features of the logic circuitry essential to the present invention.

The card is provided with disabling circuitry, 22, which can e.g., permanently erase the memory of the card. The disabling circuitry may comprise either a fuse or a switch, which operates to e.g. decouple the electrical power from the memory in card. Other means of effectively erasing the memory are known to those in the art, as by providing an excessive voltage that causes the memory to malfunction, even if it is still receiving power, or permanently incapacitating the logic circuitry by cutting it off from its source of power.

A block diagram of the telecommunications network is illustrated in FIG. 3. The telecommunications network, 30 is capable of communication with a Plurality of cell phones 10 with cards, 11, having a subscriber identity module. Each card has a unique SIM code. Upon initiation of access to the network, the SIM code is transmitted to the network. The network, 30 has data communications circuitry, 31, to receive the SIM code. In one embodiment of the invention, the network may also include a PROM or an EEPROM for receiving and storing an erase code associated with a Unique SIM code. In another embodiment of the invention, the data communication circuitry, 31, may also include an erase command.

The operation of the method and apparatus of the present invention will now be described. The user of SMARTCARD may use the alphanumeric keys, 12 to enter into, and store in the memory, an erase code to permit erasure of private data in the phone. According to a preferred embodiment of the present invention, the erase code for any selected cell phone may only be directly entered into the phone, using the keypad for that phone. The erase code may be stored in memory on the SMARTCARD or may be transferred to, and stored on, the network. The erase code for a particular SMARTCARD or SIM may not be preset or changed by an on-air signal from a cell phone with a different SIM. The erase command maybe included in the data communications circuitry of the card or on the network.

If the cell phone is stolen or lost, the user may, using another cell phone or a land line, call the telephone number of the stolen or lost cell phone, and enter the erase code. The data communications circuitry of the network and the lost phone "matches" the erase code of the on-air communication with the preset stored erase code. The "matching" may involve an exact matching of characters, or an exact mapping, requiring a specific relationship, between the preset erase code and the received erase code. If there is a match, an erase command is issued, and the private data in the stolen or lost cell phone is erased. The circuitry for executing the erase command is in the cell phone.

The present invention does not require a network database of erase codes, permitting great individual privacy. In addition, the user does not need to access disable commands on the network. No database of disabled numbers needs to be assembled and maintained by and at the network in order for the user to disable the memory for his private data. When the erase code is stored in the cell phone, it is instantly operable. In addition it may be instantly changed. The privacy of data entered into cell phones is of increasing importance. New phones incorporate Internet text messaging, e-mail, and web surfing and downloading. Elaborate negotiations may now be conducted via a cell phone. In addition, cell phones are being combined with handheld computers and organizers, which contain word processing. Entire contracts may be recorded, transmitted, or received on a handheld apparatus including a cell phone on a telecommunications network.

Figure 4:
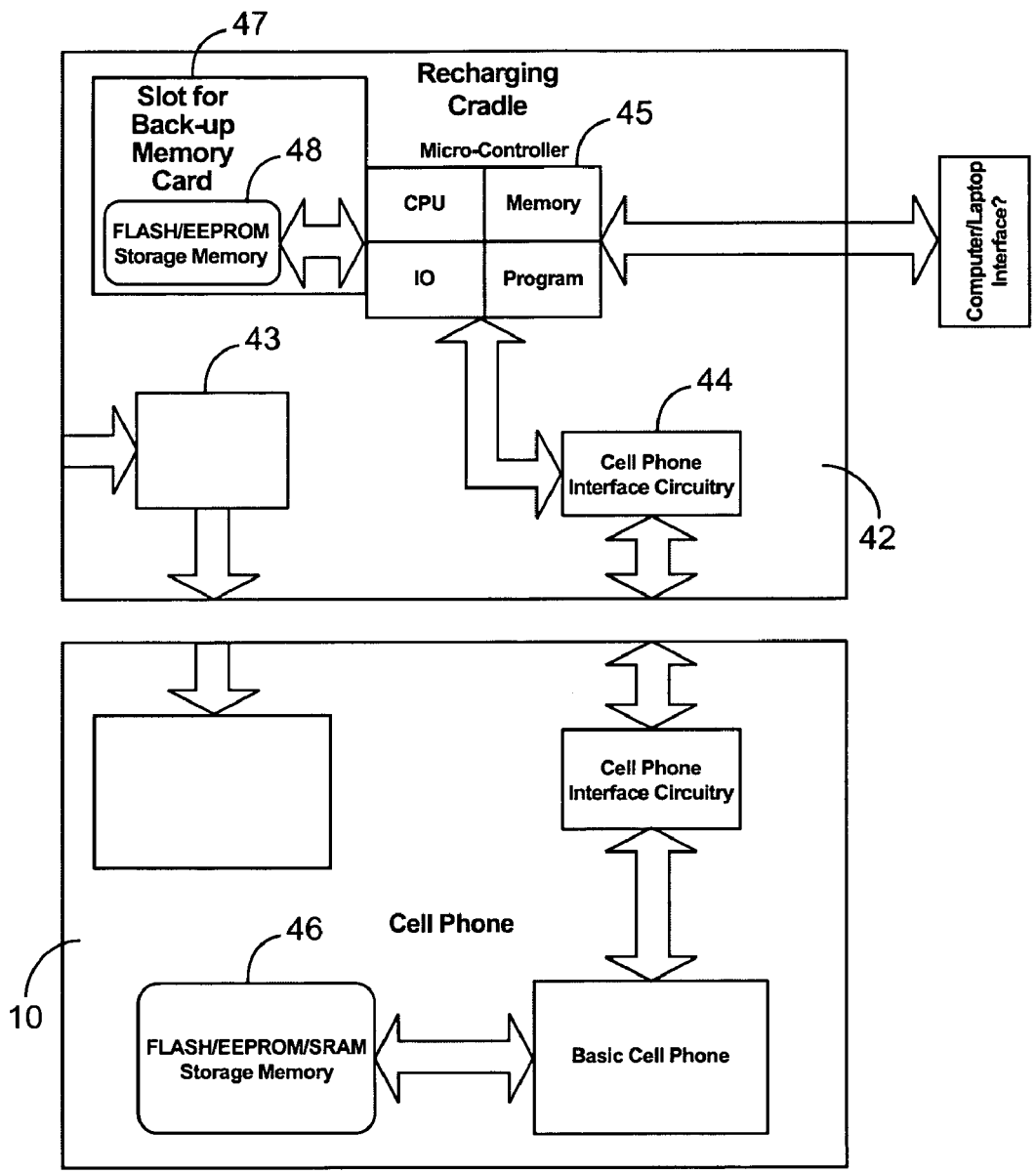
FIG. 4 illustrates a block diagram of a cell phone recharging cradle according to one embodiment of the invention.

FIG. 4 illustrates a preferred embodiment of a recharging cradle, 42, according to the present invention. The cradle includes recharging circuitry, 43, which connects to the phone, 10, when the phone is in the dock, as shown in FIG. 4. Also included in the cradle is cell phone interface circuitry, 44, which comprises an upload/download cell phone memory device, comprising a micro-controller, 45, which comprises a CPU, a memory, 10 (input output) and the program or application. The program compares the memory in the phone memory, as shown here as the erasable FLASH/EEPROM/SRAM storage memory, 46, which is part of the present invention, with the memory in the cradle, as with a check sum operation; and downloading to the cradle memory any numbers which have been added to the phone, and uploading to the phone any numbers in the cradle memory which are not in the phone.

As shown in FIG. 4, the recharging cradle may further comprise an upload/download slot, 47, for a back-up cell phone memory device, 48. The slot comprises a micro-controller and interface circuitry in communication with either the memory in a docked cell phone, or, as shown, with the memory in the cradle. The back-up memory device may be any device suitable for insertion into a new phone, such as a PCMCIA card. As shown in FIG. 4, this PCMCIA card is provided with an erasable memory.

These back-up devices provide a very convenient means for maintaining the integrity of private data for the cell phone. If the cell phone is stolen or lost, no time need be taken in an attempt to recover the stored private data, but the private data immediately erased, as a duplicate copy exists in the cradle, and optionally on the back-up PCMCIA. The back-up PCMCIA is easily stored in a wallet, while traveling, and may be placed into a new cell phone, or the PCMCIA card kept in the cradle, and data therein transferred to a new cell phone docked in the cradle. If the new cell phone has to be initially charged, charging in the cradle with PCMCIA card slot will enter all the private data into the new cell phone.

In another aspect of the present invention, a novel recharging cradle for the cell phone may be provided with an upload/download slot for receiving an additional memory device or card, such as a PCMCIA card, for maintaining the integrity of private data for the cell phone. The slot comprises a micro-controller, crystal and interface circuitry, connecting the memory device in the slot and the memory device in the phone. Once placed in the slot, the e.g. PCMCIA card is in communication with any cell phone docked in the cradle. On docking the cell phone in the cradle a check sum may be initiated, and any new data from the cell phone added to the PCMCIA card. Then, should the cell phone be stolen or lost, no time for recovery of the stored private data need be allotted, but the private data immediately erased, as a duplicate copy exists on the spare PCMCIA. The spare PCMCIA is easily stored in a wallet, while traveling, and may be placed into a new cell phone, or the PCMCIA card kept in the cradle, and data therein transferred to a new cell phone docked in the cradle. If the new cell phone has to be initially charged, charging in the cradle with PCMCIA card slot will enter all the private data into the new cell phone.

Figure 5:
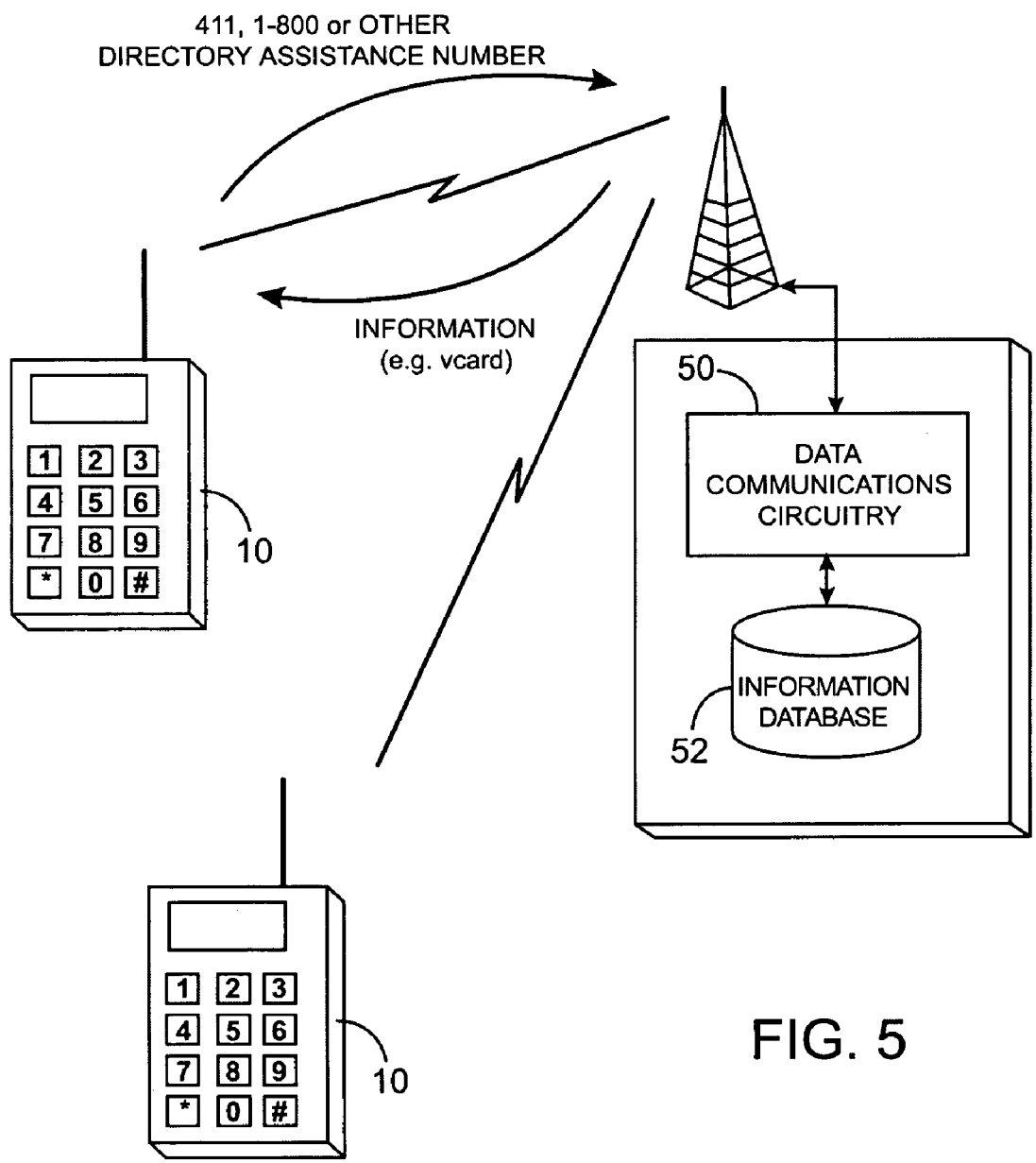

According to an embodiment of the present invention, the private data described above and/or other data, e.g., information associated with a person or entity (e.g. business, organization, or other operation), may comprise data downloaded from a cellular network service provider, in response to a 411, 1-800, or other directory assistance request from the mobile telecommunications apparatus 10. According to this embodiment of the invention, and as illustrated in FIG. 5, a user of the mobile telecommunications apparatus 10 calls a directory assistance number available on the cellular network. An operator (human or computer implemented) answers the call and asks the user for the name of the person or entity the user desires information of. In response to the name provided, the operator instructs data communications circuitry (and/or software) 50 of the cellular network service provider to access an information database 52, to retrieve information associated with the person or entity the mobile telecommunications apparatus user has requested information of. The information database 52 may be a database that is controlled by the cellular network service provider, or may be any other database controlled by a third party of which the cellular network service provider has been granted access. The retrieved information may include, without limitation, the mailing address, e-mail address, work address, telephone numbers, facsimile number, instant messaging address, maps and/or directions (particularly for GPS-equipped mobile telecommunications devices), digital photos, digital video, etc. of the person or entity the user has requested information of.

Once retrieved, the cellular network service provider transmits the information, e.g., in the form of a text message (e.g., an short message service (SMS) message) to the mobile telecommunications apparatus user. For large amounts of data, e.g., as is commonly encountered with digital photos or video, alternative means of transmission, i.e., other than text messaging may be utilized. For example, Multimedia Messaging Service (MMS) or similar transmission standard could be used to transmit such types of information.

The information retrieved from the database 52 may then be formatted (e.g., in the form of a virtual business card ("vcard"), as is now commonly used to store contact information in e-mail and wireless communication applications) prior to being transmitted to the user. Alternatively, the information may be processed and formatted by an application program running on the mobile telecommunications apparatus 10, after being received from the provider.

Upon receiving the information contained in the text message, the mobile telecommunications apparatus 10 causes a prompt to be displayed, the prompt asking the user whether he or she would like to save the information permanently. If the user responds "yes", then the information is stored in the FLASH/EEPROM/SRAM 46 or other memory of the mobile telecommunications apparatus 10. If the user responds "no", the information is only temporarily stored. Further, the information may be stored in the cradle memory and/or the FLASH/EEPROM storage memory 48 of a backup memory card 47, similar to that previously described.

Those skilled in the art should understand that while the present invention may be embodied in hardware that alternative embodiments may include software or firmware, or combinations thereof. Such embodiments may include implementations using conventional processing circuitry such as, without limitation, programmable array logic ("PAL"), digital signal processors ("DPSs"), field programmable gate array ("FPGA"), application specific integrated circuits ("ASICs"), large scale integrated circuits ("LSIs"). Moreover, the present embodiment is introduced for illustrative purposes only and other embodiments that provide a system for and method of disabling a SIM card are well within the broad scope of the present invention. Conventional computer, and processing, system architecture is more fully discussed in Computer Organization and Architecture, by William Stallings, MacMillan Publishing Co. (3rd ed. 1993). Conventional processing system network design is more fully discussed in Data Network Design, by Darren L. Spohn, McGraw-Hill, Inc. (1993). Conventional voice and data communications are more fully discussed in Data Communications Principles, by R. D. Gitlin, J. F. Hayes and S. B. Weinstein, Plenum Press (1992), The Irwin Handbook of Telecommunications, by James Harry Green, Irwin Professional Publishing (2nd ed. 1992) and Voice & Data Communications Handbook, by Regis J. Bates, Jr. and Donald Gregory, McGraw-Hill (1996). Conventional electronic circuit design is more fully discussed in The Art of Electronics, by Paul Horowitz and Winfield Hill, Cambridge University Press, (2nd ed. 1989). Conventional control systems and architectures are discussed in Modern Control Engineering by Katsuhiko Ogata, Prentice Hall 1990. Each of the foregoing publications is incorporated herein by reference.

There has thus been shown and described a novel method and apparatus for both safeguarding and maintaining the integrity of the private data in a cell phone memory, which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method of obtaining information associated with the name of a person or entity over a wireless communications network, comprising:

transmitting a request for information associated with a name of a person or entity to a wireless network operating center, from a mobile communications device;

receiving a data message transmitted from the wireless network operating center, the data message containing information associated with the name of the person or entity, the information associated with the name of the person or entity retrieved from a database at the wireless network operating center; and formatting the retrieved information in the form of a virtual business card at the mobile communications device, wherein the mobile communications device contains circuitry configured to receive a radio frequency signal containing an erase code, the erase code originating from a communications device different from the mobile communications device, and circuitry operable to prevent access to the retrieved information if the erase code contained in the received radio frequency signal matches a preset erase code stored in a memory of the mobile communications device.

2. The method according to claim 1, further comprising prompting a user of the mobile communications device as to whether to permanently store the formatted retrieved information.

3. The method according to claim 1 wherein said data message comprises a text message.

4. The method according to claim 3 wherein said text message is transmitted according to the short message service (SMS) standard.

5. The method according to claim 1 wherein said data message is transmitted according to the multimedia message service (MMS) standard.

6. The method according to claim 1 wherein said retrieved information is information selected from the group consisting of a mailing address, an e-mail address, a work address, one or more telephone numbers, a facsimile number, an instant messaging address, a map, a set of directions, one or more digital photos, a digital video, and combinations thereof.

7. An apparatus comprising:

a mobile telecommunications device including a processor and a memory coupled to the processor, the memory having stored thereon an application which when executed by the processor causes the processor to format information associated with a name of a person or entity as a virtual business card, wherein the mobile communications device contains circuitry configured to receive a radio frequency signal containing an erase code, the erase code originating from a communications device different from the mobile communications device, and circuitry operable to prevent access to the information associated with the name of the person or entity if the erase code contained in the received radio frequency signal matches a preset erase code stored in a memory of the mobile communications device.

8. The apparatus of claim 7 wherein the information associated with the name of the person or entity is retrieved from a database at the wireless network operating center upon a request from the mobile telecommunications device.

9. The apparatus of claim 7 wherein said information is information selected from the group consisting of a mailing address, an e-mail address, a work address, one or more telephone numbers, a facsimile number, an instant messaging address, a map, a set of directions, one or more digital photos, a digital video, and combinations thereof.

* * * * *